United States Patent [19]
Cox

[11] 3,817,370
[45] June 18, 1974

[54] MASS-BALANCED VIBRATING CONVEYOR
[75] Inventor: James P. Cox, Lynden, Wash.
[73] Assignee: Martin, Robertson & Bain Ltd., Vancouver, British Columbia, Canada
[22] Filed: Nov. 31, 1972
[21] Appl. No.: 305,972

Related U.S. Application Data
[63] Continuation-in-part of Ser. No. 107,178, Jan. 18, 1971, Pat. No. 3,702,655, which is a continuation-in-part of Ser. No. 14,159, Feb. 25, 1970, abandoned.

[52] U.S. Cl.. 198/220 CB, 198/220 A, 198/220 DA
[51] Int. Cl............................................. B65g 27/00
[58] Field of Search... 198/220 CB, 220 A, 220 CA, 198/220 DA; 209/313, 344, 365 R, 415

[56] References Cited
UNITED STATES PATENTS

| | | |
|---|---|---|
| 2,358,876 | 9/1944 | Overstrom .................... 198/220 CB |
| 2,709,521 | 5/1955 | Fisher ......................... 209/365 R X |
| 3,425,553 | 2/1969 | Slovic ............................ 209/344 X |

Primary Examiner—Evon C. Blunk
Assistant Examiner—Joseph E. Valenza
Attorney, Agent, or Firm—Robert W. Beach

[57] ABSTRACT

A tray mounted on inclined flexible spring leaves is vibrated by reciprocation opposite to the reciprocation of a balancing mass. The balancing mass can be motor mechanism effecting vibration of the tray through lever means or another tray which is reciprocated oppositely to the first tray.

14 Claims, 13 Drawing Figures

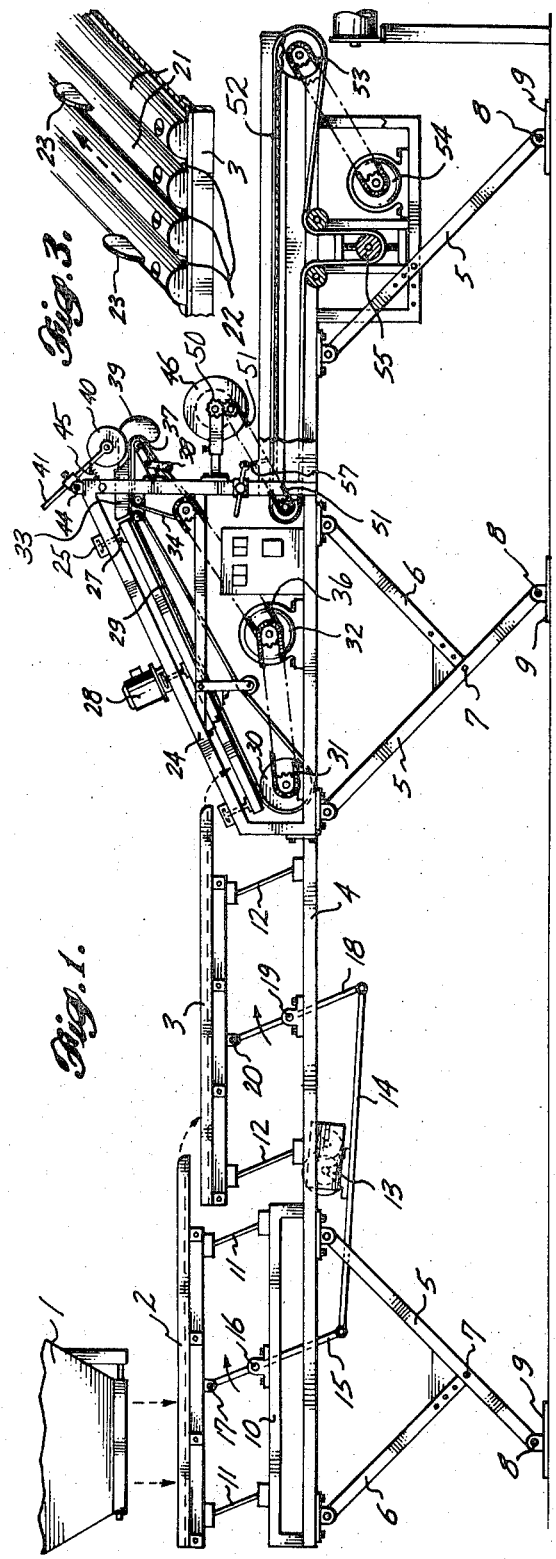
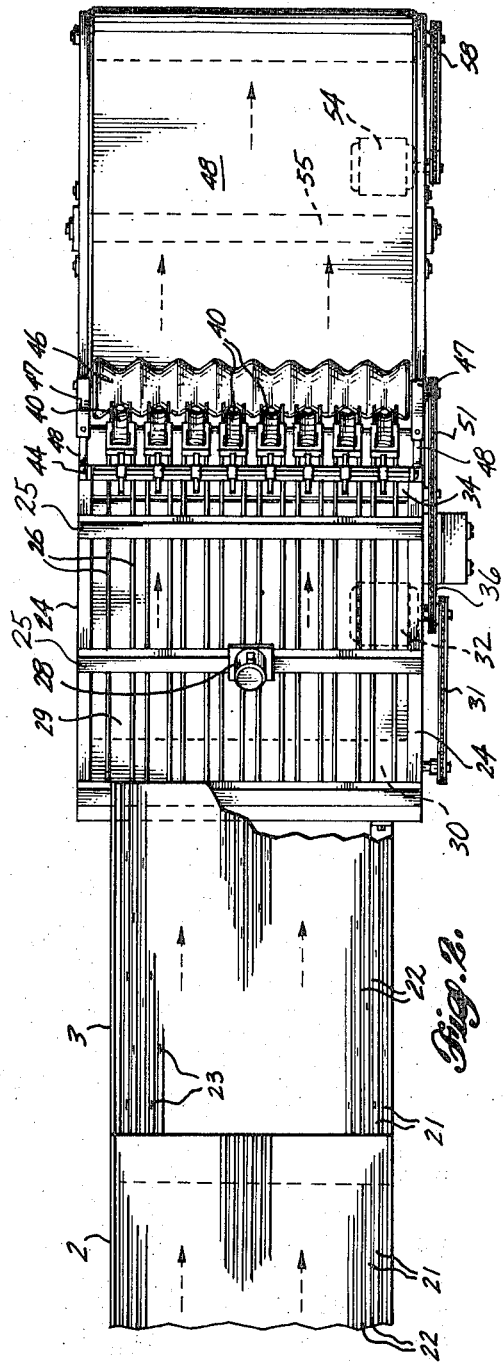

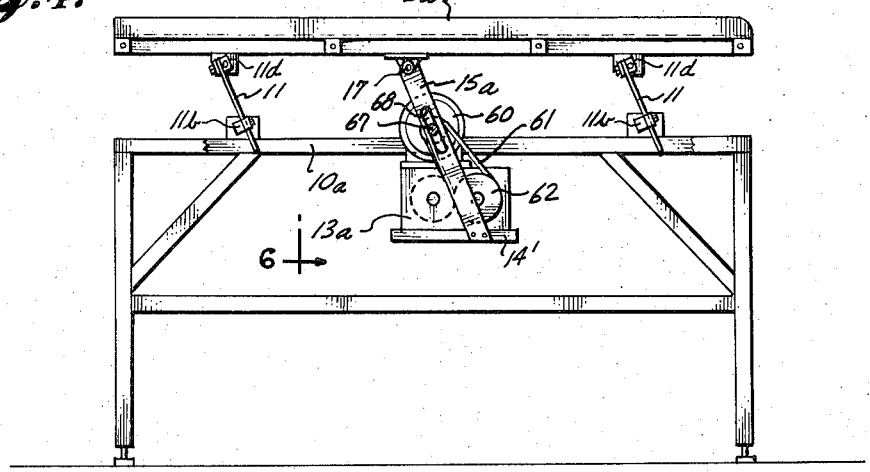
Fig. 4.
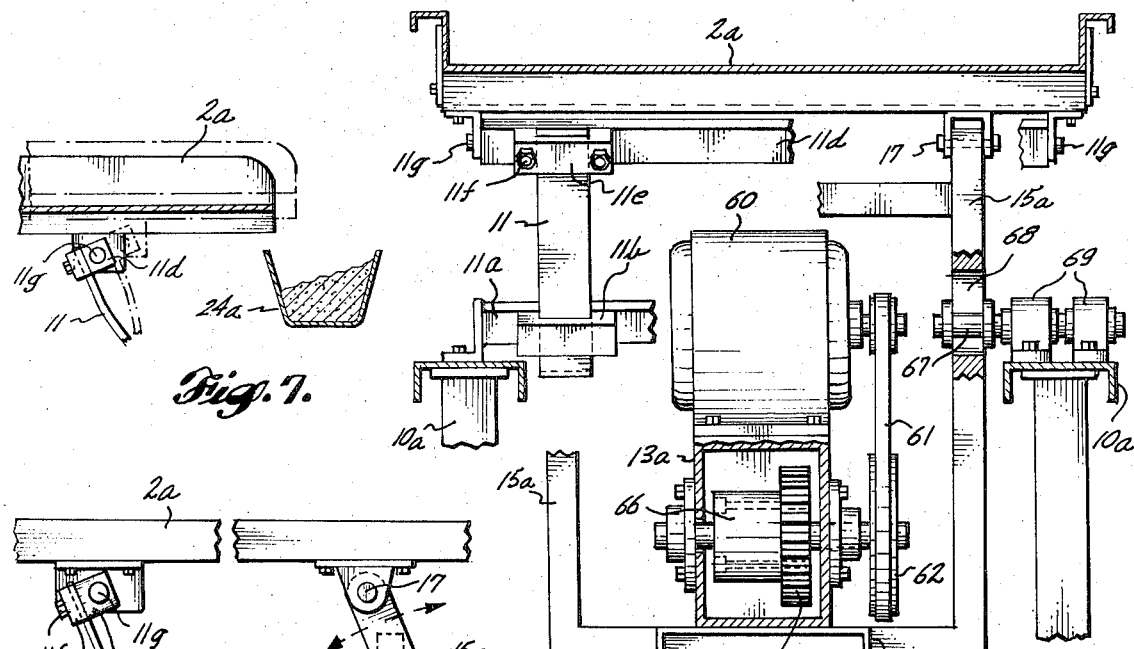
Fig. 7.
Fig. 6.
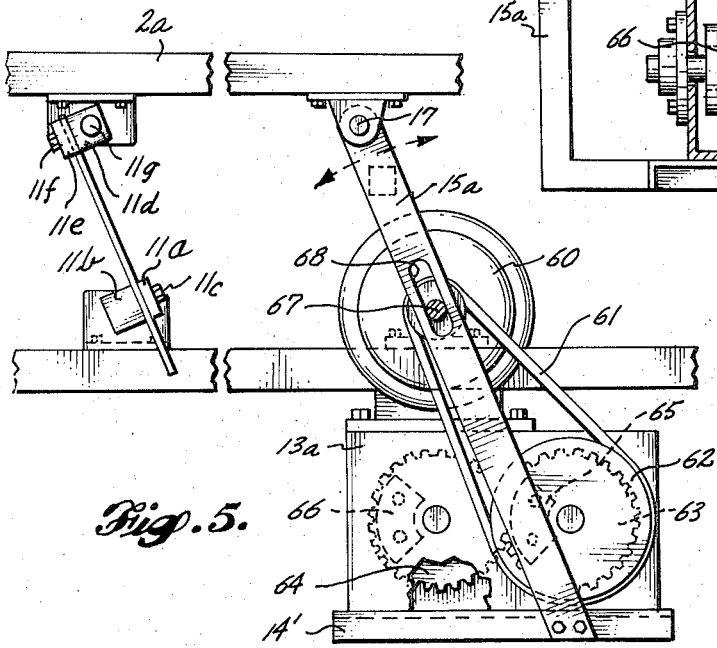
Fig. 5.

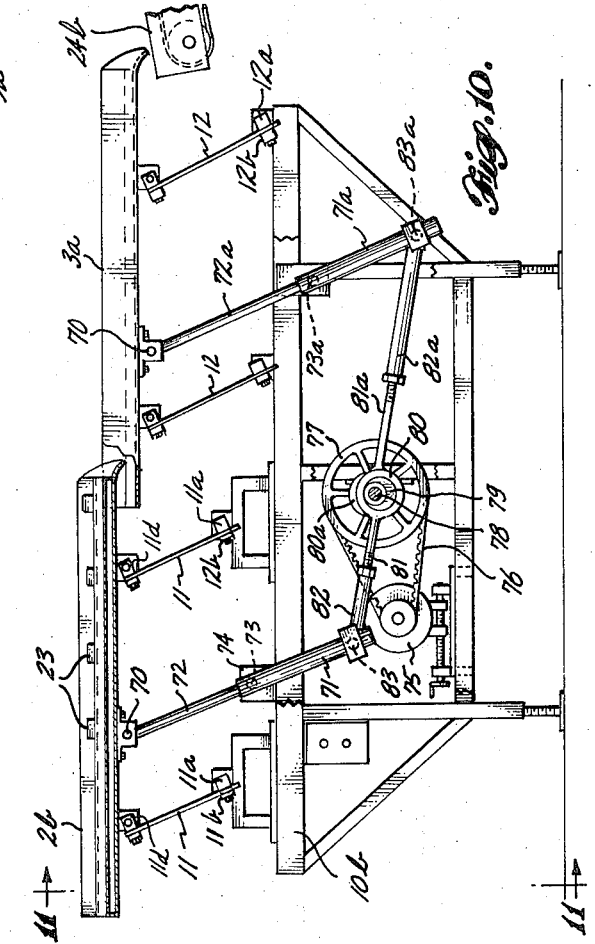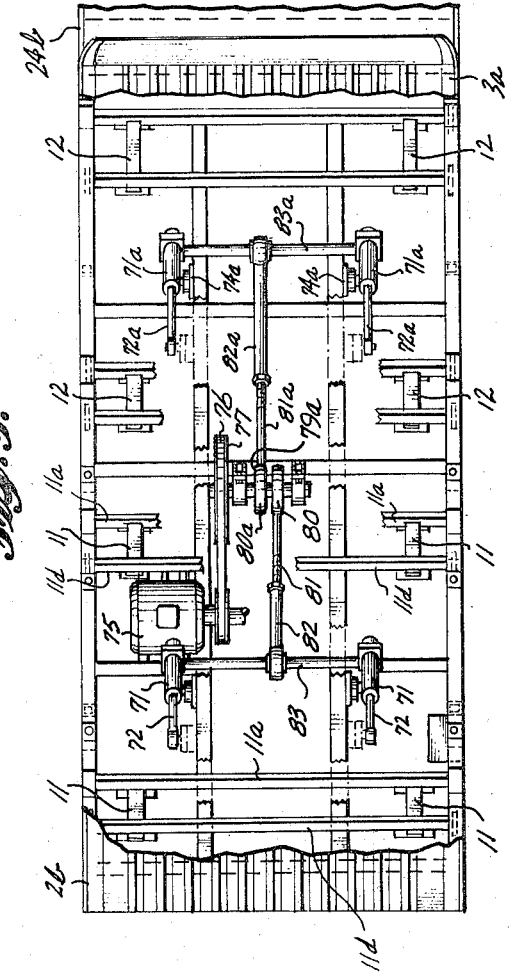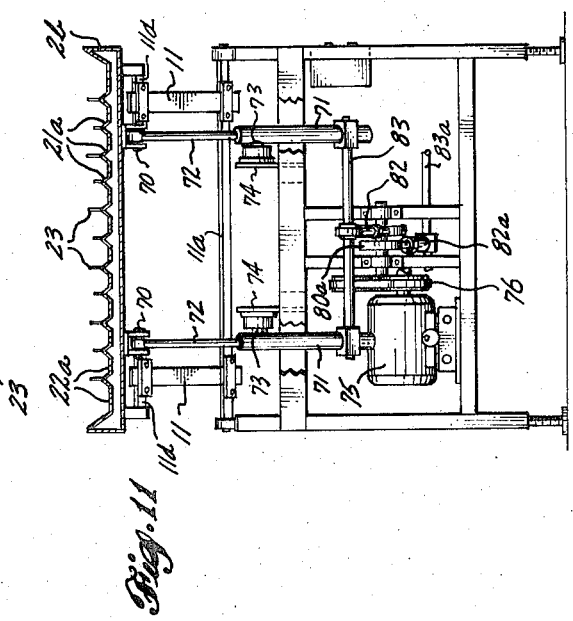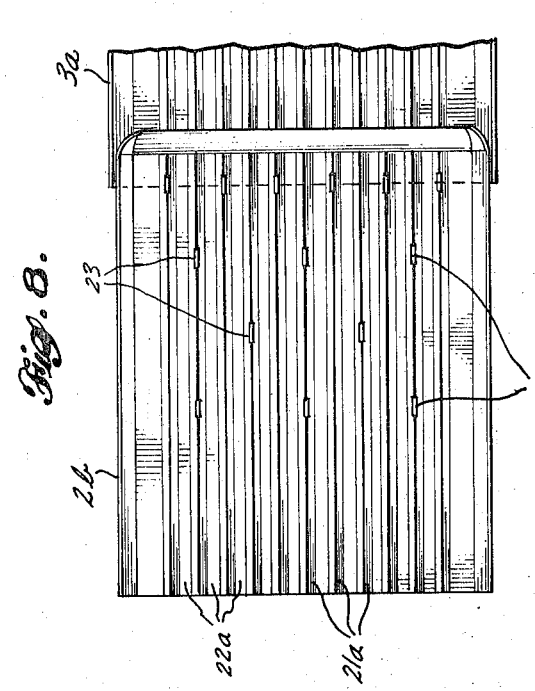

MASS-BALANCED VIBRATING CONVEYOR

This application is a continuation-in-part of application Ser. No. 107,178, filed Jan. 18, 1971, for Stick-Classifying Method and Apparatus, now U.S. Pat. No. 3,702,655, which is a continuation-in-part of application Ser. No. 014,159, filed Feb. 25, 1970, for Stick-Orienting Method and Apparatus now abandoned.

The present invention relates to conveying mechanism, in which a particular product is transported by the reciprocatory vibration of trays carrying the product.

A principal object of the invention is to provide mechanism for reciprocating a product-conveying tray or trays in a mass-balanced system so that interconnected mass components move in opposite directions to provide counteracting inertia forces. More specifically, it is an object to connect mass components of the system by lever means including a lever or levers pivoted centrally with one mass connected to one end of each lever, and the balancing mass connected to the other end of the lever.

Another object is to effect the drive of a reciprocating tray by a lever producing a force only transversely of the lever, and not longitudinally of the lever, so that the tray can be reciprocated equally freely irrespective of the load of particulate material carried by the tray.

A further object is to provide a reciprocating tray and drive mechanism in which the amplitude of reciprocation is reduced automatically as the load increases.

FIG. 1 is a side elevation of apparatus embodying conveyor mechanism according to the present invention, and FIG. 2 is a plan of such apparatus.

FIG. 3 is a detail top perspective on an enlarged scale of a portion of the conveyor mechanism.

FIG. 4 is a side elevation of another form of conveyor mechanism according to the present invention. FIG. 5 is an enlarged fragmentary side elevation of a portion of such mechanism, and FIG. 6 is an enlarged transverse section through such mechanism taken on line 6—6 of FIG. 4. FIG. 7 is an enlarged fragmentary vertical longitudinal section through the discharge end portion of such conveyor mechanism.

FIG. 8 is a plan of a portion of another type of conveyor mechanism embodying the present invention, and FIG. 9 is a plan of such mechanism with parts broken away. FIG. 10 is a side elevation of such conveyor mechanism, and FIG. 11 is a transverse section through the mechanism taken on line 11—11 of FIG. 10.

Figure 12:
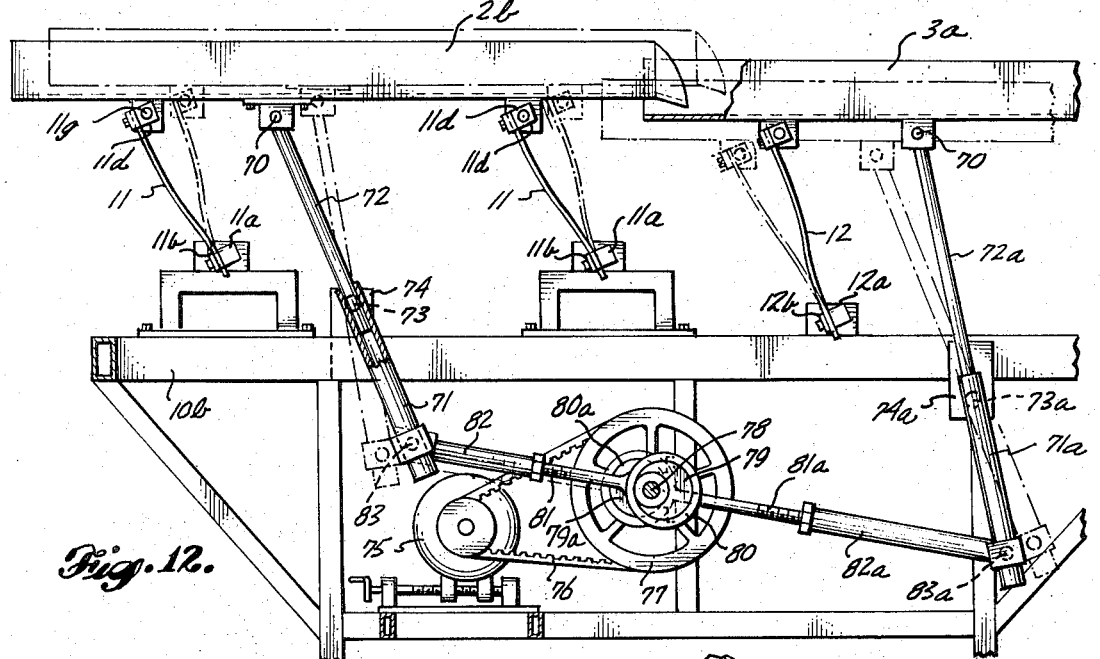
Figure 13:
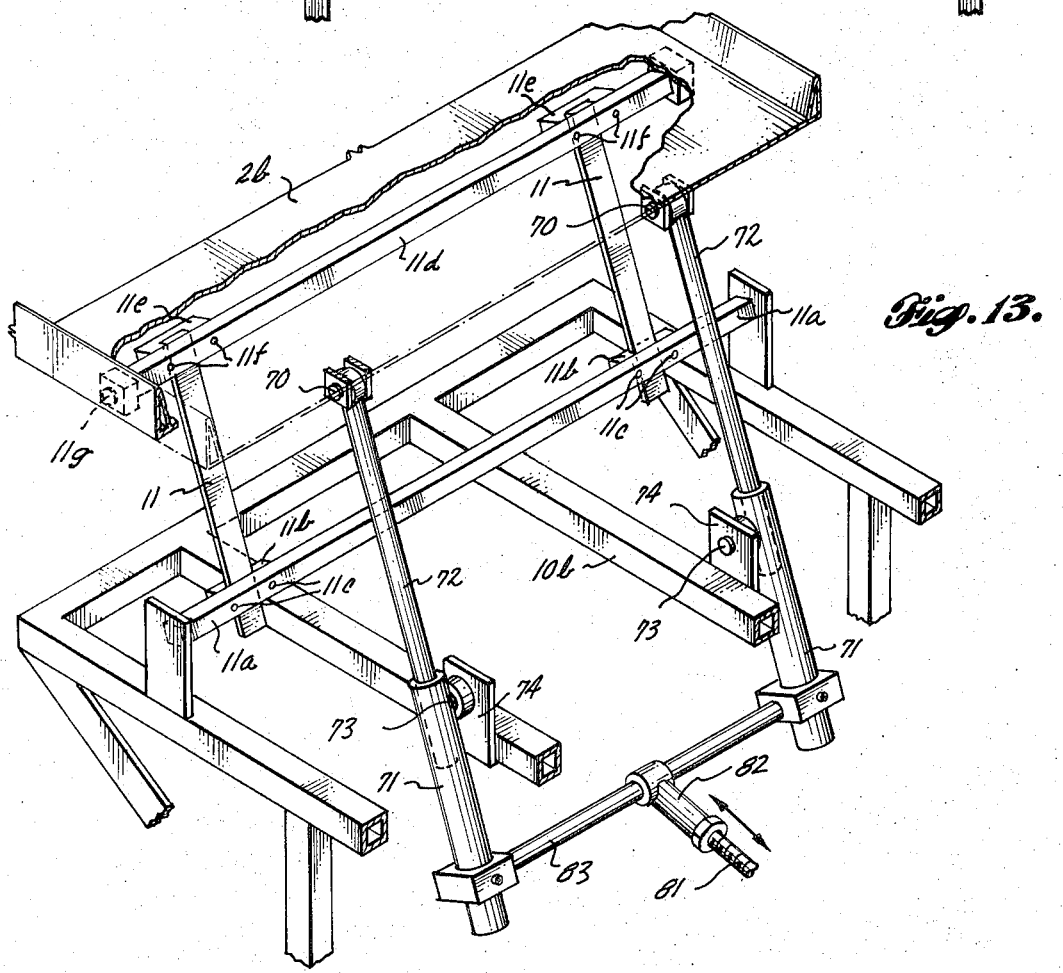

FIG. 12 is an enlarged side elevation of the conveyor mechanism shown in FIGS. 8 to 11, parts being broken away. FIG. 13 is a top perspective of a portion of such mechanism with parts broken away.

While the conveyor mechanism of this invention can be used for transporting a variety of products, a particularly beneficial use of the mechanism is for arranging elongated articles, such as asparagus shoots, in parallel arrangement. Conveyor mechanism effective for this purpose is shown in FIGS. 1, 2 and 3. In the use of such mechanism, the asparagus shoots will be delivered in random orientation into a supply hopper 1 from which asparagus shoots can be dispensed to successive aligning conveyors or feed trays 2 and 3 which serve both to feed the asparagus shoots lengthwise and to arrange them in generally parallel relationship.

The successive vibrating aligning conveyors 2 and 3 shown in FIG. 1 are mounted on a frame 4, which is supported by legs 5 and braces 6 connected to such legs by pins 7. The lower ends of the legs are mounted by pins 8 on floor plates 9. By such leg arrangement the space beneath the supporting frame 4 is least obstructed to facilitate cleaning of the floor.

The first vibrating conveyor 2 is supported at an elevation somewhat above the second conveyor 3 by an auxiliary frame 10 mounted on the main frame 4. The conveyor tray is supported from such auxiliary frame by upright spring leaves 11, which are inclined from the vertical to some extent relative to the tray so that the vibration of the conveyor table will effect feeding of the shoots toward the right, as seen in FIG. 1. Correspondingly, the tray of conveyor 3 is supported from the frame 4 by upright spring leaves 12, which are inclined somewhat relative to the vertical and relative to the tray.

The two conveyor trays are reciprocated by vibrating mechanism which is common to the two conveyors. Such vibration is effected by vibrating mechanism 13 including a motor driving an eccentric weight, which mechanism is mounted centrally on a platform 14 suspended from the conveyor frame. The lower end of a lever 15, pivotally connected to one end of the platform 14, is mounted intermediately of its ends by fixed pivot 16 for oscillation relative thereto. The upper end of such lever is connected to the tray 2 of the first conveyor by another pivot 17. The opposite end of the platform 14 is pivotally connected to the lower end of another lever 18, which is mounted on the frame by a pivot 19. The upper end of this lever is attached to the tray 3 of the conveyor by a pivot 20.

As the eccentric weight of the vibrator 13 is driven, the conveyor trays 2 and 3 will be vibrated. Because of the inclination of their supporting spring leaves 11 and 12 such tables will pitch to the right as well as being vibrated, to propel the asparagus shoots to the right, first along tray 2 to be deposited onto tray 3, and then along tray 3 to be discharged from its right end. As shown best in FIGS. 2 and 3, each of the vibrating conveyor trays has ridges 21 and intervening grooves 22 extending lengthwise of it. Consequently, as these trays are vibrated the shoots will be oriented so that their lengths extend lengthwise of such ridges and grooves.

To effect swinging of any asparagus shoots lying across ridges 21, fins 23 or other projections may be provided at spaced locations along the ridges so as to impede movement of the shoots along at least tray 3 transversely of their lengths. Engagement of an asparagus shoot with one of the projections 23 off center will effect swinging of the shoot toward alignment with the ridges 21 and grooves 22 as the vibrating action impels the shoot along the conveyor.

The weight of tray 2 and the asparagus products which is carries is supported almost entirely by the spring leaves 11. Correspondingly, the weight of tray 3 and the asparagus products which it carries is supported almost entirely by the spring leaves 12. Swinging of the lever 15 about its central pivot 16 effects reciprocation of tray 2 during which movement spring leaves 11 bend alternately to each side of their neutral positions. Correspondingly, swinging of lever 18 about its central pivot 19 effects reciprocation of tray 3 to each side of a neutral position, accompanied by flexure of the spring leaves 12 which support it.

The motor 13 and its associated vibrating mechanism are mounted on the platform 14 and reciprocate with it. The vibrating mechanism driven by motor 13 is of a character such as to impart lengthwise movement to the platform 14. Because the ends of the levers 15 and 18 are connected by the platform 14 below their fixed pivots 16 and 19, respectively, such levers will swing in unison in the same sense. Furthermore, because the trays 2 and 3 are connected to the upper end portions of levers 15 and 18, respectively, and the platform 14 connects the lower ends of such levers, the trays 2 and 3 will move in the same direction at any instant, but such direction of movement will be opposite to the direction of reciprocation of platform 14. It is preferred that the combined weight or mass of the trays 2 and 3 be approximately equal to the weight or mass of the platform 14, motor 13, and the vibrating mechanism which the motor drives. Consequently, if the levers 15 and 18 are supported by their pivots 16 and 19, respectively, approximately at their midpoints, the force produced by the mass of the trays 2 and 3, moving in one direction, will be approximately balanced by the mass of the platform 14 and drive mechanism, including motor 13, moving in the opposite direction.

The substantially balanced action of the principal masses of the vibrating system, namely the trays 2 and 3 on the one hand and platform 14, motor 13 and the vibrating mechanism on the other hand, moving in opposite directions at any instant will largely neutralize the forces tending to displace the vibrating conveyor. Consequently, there is virtually no tendency of the vibrating conveyor assembly to move bodily in any direction, and transmission of vibrations to the supporting structure 4, 5, 6, 8 and 9 is minimized.

As has been stated above, it is preferred that the levers 15 and 18 be pivoted at approximately their centers. The length of the upper arm of lever 15 should, however, be approximately the same as the lengths of the spring leaves 11 supporting the tray 2. Also, the length of the upper arm of the lever 18 should be approximately equal to the lengths of the spring leaves 12 supporting tray 3. It is not necessary that the length of the spring leaves 11 supporting tray 2 be the same as the lengths of the spring leaves 12 supporting the tray 3. The amplitude of reciprocation depends on the comparative lengths of the lever arms connected to the two trays and the angle of swing of the levers.

In the construction shown in FIG. 1, the upper arm of lever 15 and the spring leaves 11 are shorter than the upper arm of lever 18 and the spring leaves 12. Also, the lower arm of lever 15 is longer than the lower arm of lever 18. Consequently, the angle of swing of lever 15 will be less than the angle of swing of lever 18. Because the angle of swing of lever 18 is greater than the angle of swing of lever 15 and the upper arm of lever 18 is longer than the upper arm of lever 15, the amplitude of reciprocation of tray 3 will be greater than the amplitude of reciprocation of tray 2. Consequently, the product on tray 3 will be transported along that tray faster than the product will be transported along tray 2. The product on tray 3 will therefore be spaced apart lengthwise of the tray more than the product on tray 2.

From tray 3 the asparagus shoots are discharged onto a conveyor mounted on a frame having upwardly inclined longitudinal side bars 24 connected by crossbars 25. Spaced, parallel, conveyor-divider plates 26 are carried by crossbars 27 of I-beam shape, the upper flanges of which are slidably received in the downwardly opening frame cross channels 25. An eccentric weight vibrating motor 28 is mounted on one of the divider-supporting crossbars 27 to vibrate the divider-plate and crossbar assembly to facilitate movement of the asparagus shoots 70 upward along the conveyor one at a time and to reduce friction between the asparagus shoots and the divider plates.

The individual asparagus shoots are actually moved up the slope of the singling feed conveyor by lying on the upper stretch of an endless conveyor belt 29. The conveyor belt loop extends around spaced pulleys, and the lower pulley 30 is driven by a chain 31 powered by a motor 32. Such inclined conveyor belt transports the asparagus shoots upward to discharge them between stationary conveyor side plates 33 and onto belt 34 adjacent to the upper end of such conveyor. From belt 34, the shoots are launched onto discharge belt 52, as described in U.S. Pat. No. 3,702,655.

The conveyor mechanism shown in FIGS. 4 to 7, inclusive, differs from that shown in FIGS. 1 to 3, inclusive, because such mechanism includes only one tray 2a supported on the frame 10a. In this instance, the tray is vibrationally reciprocated by the vibrating mechanism 13a, shown in detail in FIGS. 5 and 6. Such vibrating mechanism can be of the same general type as the vibrator 13 for the conveyor of FIGS. 1 and 2. The vibrating mechanism includes a motor 60 driving a belt 61 to turn a pulley 62 that drives a gear 63. Such gear is enmeshed with another gear 64, which may be of the same size as the gear 63.

An eccentric weight 65 is attached to the gear 63 and may be of arcuate shape and approximately one quadrant in extent. A similar eccentric weight 66 of arcuate shape approximately one quadrant in extent is mounted on gear 64 in the same phase relationship as the weight 65 on gear 63. Conjoint rotation of the gears 63 and 64 will effect conjoint orbital rotation of the eccentric weights 65 and 66, so that the platform 14' mounted on the lower arm of lever 15a will tend to execute a circulatory movement. The central portion of this lever is prevented from moving circularly by the pivot 67 extending through the slot 68 in the lever arm, which is elongated lengthwise of the arm. The pivot is mounted in cantilever fashion by pillow blocks 69 mounted on the frame 10a.

Four spring leaves 11 support the tray 2a. These four leaves are arranged in two pairs, each pair being adjacent to one end of the tray. The leaves of each pair are located at opposite sides of the vibrating mechanism 13a.

The construction is shown best in FIG. 6 in which left lever 15a is broken away to show the leaf mounting structure. The leaf 11 and the mounting structure are broken away at the right of FIG. 6 to show clearly pivot mounting structure for a lever 15a. Bars 11a connect the lower portions of the spring leaves of each pair, and the ends of such bars are supported by the opposite sides of the frame 10a. Each spring leaf is secured to a crossbar 11a by a channel-shaped block 11b, the opposite ends of which are secured to the bar 11a by bolts 11c. The upper end of each spring leaf 11 is secured to a bar 11d by a channel-shaped block 11e secured in place by bolts 11f. The opposite ends of the bar 11d have trunnions 11g engageable with apertured ears on the bottom of the tray 2a.

As the motor 60 drives the gears 63 and 64 carrying the eccentric weights 65 and 66, the vibrating mechanism, the platform 14' and the lower arms of the levers 15a carrying such platform will tend to move in a circulatory motion. Because vertical movement of tray 2a is limited by leaves 11, lengthwise motion of the levers 15a will be restrained by the pivots 17 connecting the upper ends of the levers to the tray 2a. Consequently, the tray will be reciprocated lengthwise with an upward and forward pitching movement effected by the inclined positions of the levers 15a and the inclined spring leaves 11. It will be noted in FIG. 4, as well as in FIG. 1, that the levers and the spring leaves are substantially parallel. The inclined attitude of these members effects an upward pitching movement of the tray as well as a longitudinal movement. Material on the tray will therefore be moved in the direction toward which the upper ends of the spring leaves and the levers move as the spring leaves and levers move toward vertical position.

The amplitude of reciprocation of the tray 2a can be altered by adjusting the lengths of the portions of the spring leaves 11 between the bars 11a and 11d. The bolts 11c can be loosened, for example, and the tray 2a can be raised or lowered, as may be preferred. The slots 68 in the levers 15a enable such levers to be raised or lowered relative to the pivots 67. Altering the lengths of the upper lever arm and of the spring leaves will correspondingly alter the amplitude of reciprocation of tray 2a, and, consequently, the speed of movement of products along such tray. Moreover, if the tray is more heavily loaded with products, spring leaves 11 will be bent downward and levers 15a will be moved lengthwise downward relative to pivots 67. Such lever movement caused by increasing the load on the tray 2a will automatically reduce the amplitude of reciprocation of the tray because of the shortening of the upper lever arm.

In the conveyor mechanism shown in FIGS. 4 to 7, inclusive, the floor of the tray 2a is planar instead of having grooves extending lengthwise of it, such as the grooves 22 of the trays 2 and 3 shown in FIGS. 2 and 3. Such a tray, therefore, would not tend to align elongated articles with their lengths in parallel relationship, but would usually be used for particulate material, such as peas, beans, or rice, for example. Alternatively, the upper surface of the tray could have wider longitudinal grooves, such as the grooves 22a between the ridges 21a on tray 2b, shown in FIGS. 8, 9 and 11.

The tray 2b, shown in FIGS. 8 to 13 inclusive, is supported by two pairs of spring leaves 11, and the tray 3a is supported by two pairs of spring leaves 12, as described in connection with the conveyor mechanism of FIGS. 1 and 2. Also, as in such previous construction, the spring leaves 12 supporting the tray 3a are longer than the spring leaves 11, supporting the tray 2b. In addition, the tray 2b is located somewhat higher than the tray 3a, comparable to the relationship of the trays 2 and 3, in FIG. 1.

In this instance, however, the levers which are swung to reciprocate the trays 2b and 3a are not of fixed length, but are of telescoping construction. Thus, the lever effecting reciprocation of tray 2b includes the lower tubular arm 71, into which the upper arm 72 can slide lengthwise. The upper portion of the lower arm is swingably supported by a pivot 73 carried by a pivot mount 74 projecting upward from frame 10b. Similarly, the lever for effecting reciprocation of tray 3a includes a lower tubular portion 71a, into which the upper arm 72a can reciprocate. The upper portion of the lower arm 71a is supported by a pivot 73a mounted on a pivot support 74a carried by the frame 10b.

The upper portion of the upper lever arms 72 and 72a are connected by pivots 70 to blocks carried by the trays 2b and 3a, respectively. Swinging of such levers will effect lengthwise reciprocation of the trays, as indicated in broken lines in FIG. 12. The drive mechanism is connected to the levers for driving the two trays, so that the trays will move oppositely for balancing movement of their mass. The spring leaves 11 and 12 will flex during reciprocation of the trays, as indicated in broken lines in FIG. 12.

To effect swinging of the tray actuating levers in opposite phase, the drive mechanism shown in FIGS. 10, 11, and 12, is utilized. Such drive mechanism includes a motor 75 driving a belt 76 to turn pulley 77. On the shaft 78 carrying this pulley are two eccentrics 79 and 79a, mounted in opposite phase relationship. These eccentrics turn in rings 80 and 80a, respectively, which rings are carried by the ends of reciprocatory connecting rods that are variable in effective length. One connecting rod composed of threadedly connected sections 81 and 82 is connected to the lower end of lower lever arm 71 by pivot 83. Correspondingly, the connecting rod composed of sections 81a and 82a, and carrying ring 80a, is connected to the lower end of lower lever arm 71a by pivot 83a.

Because the eccentrics 79 and 79a are mounted in opposite phase relationship on the shaft 78, the connecting rods 81, 82 and 81a, 82a will be reciprocated in opposite phases. Correspondingly, the levers 71, 72 and 71a, 72a for reciprocating the trays 2b and 3a, respectively, will swing in opposite phase relationship, as indicated in FIG. 12. The masses of the two tray system will, therefore, always be reciprocating opposite to each other to balance substantially the dynamic forces developed by the conveyor system.

Lever arms 71 and 71a are shown as being of approximately the same length. Consequently, the angular displacement of such lever arms effected by the eccentric drive mechanism will be substantially equal. Since the upper lever arm 72a connected to tray 3a is considerably longer than the upper lever arm 72 connected to tray 2b, however, and the spring leaves 12 are longer than the spring leaves 11. The amplitude of reciprocation of tray 3a will be considerably greater than the amplitude of reciprocation of tray 2b. Consequently, product will be moved along tray 3a at a higher speed than product is moved along tray 2b, resulting in the product on tray 3a being spread apart lengthwise of the tray a greater distance than the spacing between particles of the product on tray 2b lengthwise of the tray. Product will be dumped from the discharge end of tray 3a onto the discharge conveyor 24b.

Because of the freely telescoping character of the sections 71, 72 of one lever arm, and the sections 71a, 72a of the other lever arm, the length of the supporting spring leaves 11 and 12 can be adjusted as may be preferred to effect the desired relative amplitude of reciprocation of trays 2b and 3a. Such adjustment can be made by loosening the bolts in leaf mounting blocks 11b and 12b to release the lower leaf ends, raising or lowering respective trays 2b and 3a to preferred positions and then tightening such bolts. Also, increasing the load of product on the trays, causing greater deflection of the supporting spring leaves, will not cause any end thrust on or binding of the tray-reciprocating levers. The levers are variable in effective length by altering the length of the upper arms 72 and 72a effected by changing the elevations of the trays 2b and 3a, just as changing the elevation of tray 2a in FIG. 5 will vary the effective length between the central pivot 67 and the upper pivot 17 of levers 15a.

Also, the degree of elevational movement effected by the trays 2b and 3a can be altered within a considerable range, as desired, by changing the angle of inclination of the supporting spring leaves 11 and 12. Such angular change can be made by rotating the leaf-supporting bars 11a and 12a. The inclination of the drive levers can be adjusted correspondingly by adjusting the length of the connecting rods 81, 82 and 81a, 82a.

I claim:

1. In a mass-balanced vibrating conveyor including a tray, generally parallel leaves inclined relative to the tray and supporting the tray generally horizontally, and drive means for effecting reciprocation of the tray generally horizontally but the tray being raised during reciprocation in one direction and lowered during reciprocation in the opposite direction, the improvement comprising pivot means, lever means independent of the tray-supporting leaves, guided by said pivot means for swinging about said pivot means and having a first arm at one side of said pivot means connected to the tray and disposed generally parallel to the leaves and having a second arm at the other side of said pivot means, and a balancing mass of approximately the same mass as the tray connected to said second arm of said lever means for reciprocating movement always in the direction opposite to the direction of reciprocation of the tray.

2. The conveyor defined in claim 1, in which the lever means are freely movable lengthwise relative to the pivot means.

3. The conveyor defined in claim 2, in which the lever means includes a lever member having therein an elongated slot arranged with its length extending lengthwise of said lever member, and the pivot means includes a pivot extending through such slot.

4. The conveyor defined in claim 1, in which the two arms of the lever means are of relatively telescoping structure, and the pivot means are engaged with the second arm of the lever means.

5. The conveyor defined in claim 1, in which the balancing mass is carried by and moves with the second arm of the lever means.

6. The conveyor defined in claim 1, in which the balancing mass includes the drive means.

7. The conveyor defined in claim 1, in which the balancing mass includes a second tray adjacent to the first tray, second lever means connected to said second tray for effecting swinging thereof, and means connecting the two lever means for effecting conjoint swinging thereof in opposite directions to reciprocate the two trays in opposite directions.

8. The conveyor defined in claim 7, the second lever means including a portion inclined relative to the second tray, and generally parallel leaves inclined relative to and supporting the second tray and disposed substantially parallel to said portion of the lever means inclined relative to the second tray.

9. The conveyor defined in claim 8, in which the leaves supporting one of the trays are longer than the leaves supporting the other tray.

10. The conveyor defined in claim 1, and means supporting the leaves for adjustment to vary their effective length.

11. The conveyor defined in claim 1, means supporting the leaves for adjustment of their degree of inclination relative to the tray supported by them, and means for changing the degree of inclination of the lever means correspondingly.

12. The conveyor defined in claim 1, in which the balancing mass includes a second tray adjacent to the first tray, second lever means connected to said second tray for effecting swinging thereof, and means connecting the two lever means for effecting conjoint swinging thereof.

13. The conveyor defined in claim 12, the second lever means including a portion inclined relative to the second tray, and generally parallel leaves inclined relative to and supporting the second tray and disposed substantially parallel to such portion of the lever means inclined relative to the second tray.

14. The conveyor defined in claim 13, in which the leaves supporting one of the trays are longer than the leaves supporting the other tray.

* * * * *

PO-1050
(5/69)

UNITED STATES PATENT OFFICE
CERTIFICATE OF CORRECTION

Patent No. 3,817,370　　　　　　　　Dated　June 18, 1974

Inventor(s) James P. Cox

It is certified that error appears in the above-identified patent and that said Letters Patent are hereby corrected as shown below:

Title page, section 22, change "31," to --13,--.

Signed and sealed this 8th day of October 1974.

(SEAL)
Attest:

McCOY M. GIBSON JR.　　　　　　　　C. MARSHALL DANN
Attesting Officer　　　　　　　　　　Commissioner of Patents